United States Patent [19]

Graf

[11] Patent Number: 4,937,919

[45] Date of Patent: Jul. 3, 1990

[54] SAW TOOTH ALL-STEEL CARD CLOTHING

[75] Inventor: Ralph A. Graf, Freienbach, Switzerland

[73] Assignee: Graf & Cie. AG, Rapperswil, Switzerland

[21] Appl. No.: 340,220

[22] Filed: Apr. 19, 1989

[30] Foreign Application Priority Data

Aug. 24, 1988 [CH] Switzerland ............... 3140/88

[51] Int. Cl.⁵ ........................................... D07G 15/84
[52] U.S. Cl. ....................................................... 19/114
[58] Field of Search ................................. 19/113, 114

[56] References Cited

U.S. PATENT DOCUMENTS 2,731,676 1/1956 Apthorp et al. ................. 19/114
4,606,095 8/1986 Egerer ............................... 19/97

FOREIGN PATENT DOCUMENTS 286339 2/1966 Australia.
7008523 8/1980 Japan.
6057413 9/1981 Japan.
944854 12/1963 United Kingdom.
1155605 6/1969 United Kingdom.

OTHER PUBLICATIONS

Melliand Textilberichte, Dec. 1969, pp. 1401-1410.

Primary Examiner—Werner H. Schroeder
Assistant Examiner—Michael A. Neas
Attorney, Agent, or Firm—Ladas & Parry

[57] ABSTRACT

A saw tooth all-steel card clothing which includes a foot section followed by a web section including the teeth. The total height of the foot and web section amounts to less than 2.0 millimeters and more than 0.5 millimeters, and the ratio of the total height to the height of the foot amounts to less than 1.8.

6 Claims, 1 Drawing Sheet

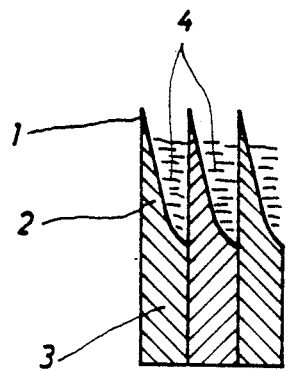
Fig.1
PRIOR ART
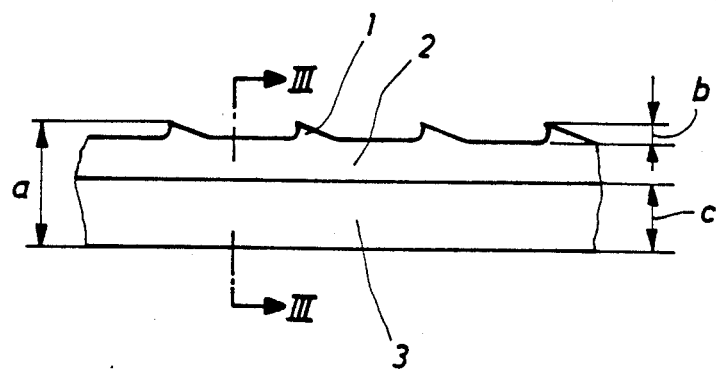 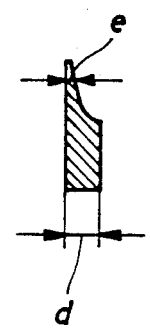
Fig.2   Fig.3
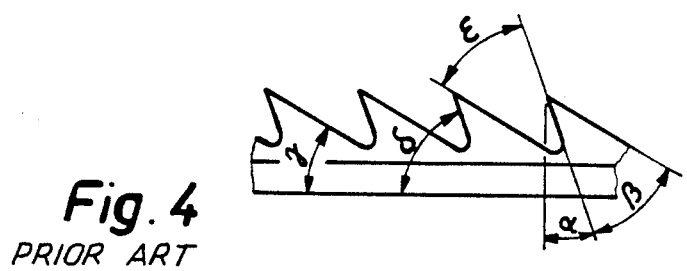
Fig.4
PRIOR ART

SAW TOOTH ALL-STEEL CARD CLOTHING

BACKGROUND OF THE INVENTION

1. FIELD OF THE INVENTION

The present invention relates to a saw tooth all-steel card clothing for a carding engine, which card clothing includes a foot section followed by a web section including the teeth.

2. DESCRIPTION OF THE PRIOR ART

In carding machines such card clothing in the form of saw-tooth wires are wound helically onto the main drum in a mutually closely abutting condition. This clothing cooperates with further card clothings located at the flat or the flats, respectively, of the carding engine and having a same or any other kind of design such to card fibres fed therebetween.

The customary dimensions of the saw tooth all-steel card clothing are set in accordance with the international standards ISO 5234, according to which the card clothing must have a total height of at least 2.0 millimeters. This total height is composed of the height of the foot section and the height of the web section of the saw-tooth wire, whereby the foot section can feature a height of 1.0–1.6–1.8 millimeters. The width of the foot is hereby in a range from 0.4 up to the commonly used maximal value of about 2.5 millimeters. For a carding of textile fibres consisting of natural or synthetic polymers by means of the common saw tooth all-steel card clothing, it is customary to use a card clothing on the main drums of the carding engines having a total height in the range of 2.0–3.2 millimeters, whereby the corresponding height of the foot is in the range from 1.2–1.4 millimeters.

It is generally known, that in operation of the carding machine when the main drum is rotating, not all fibres are driven by the centrifugal forces against the envelope of the main drum. Specifically, due to an irregular doffing from the main drum onto the doffer roller, a certain filling of the spaces between the respective web sections of adjacent sawtooth wires contacting each other by fibres occurs. Due to the continued feeding of further fibres to be carded, a condensing of fibres occurs now under the carding area between the teeth or needles, respectively, of the all-steel card clothing. Due to the fact that these fibres are pressed into the area of the all-steel card clothing where no carding happens, a considerable accumulation of fibres is formed in the mentioned dead spaces. Quite obviously the extent of this accumulation depends among other factors from the length of the fibres, from their crimp, from their surface structure and also from the thickness of the fibres. These fibres are now no longer caught by the tips of the teeth of the card clothing of the flats, i.e. they are generally displaced or removed, respectively, from the carding area. The doffing of the fibres by the doffing roller is also influenced and it is specifically possible, that an irregular transfer between main drum and doffer roller occurs, which produces obviously detrimental effects on the carded product.

Attempts have been made to overcome this drawback by a reducing of the volume present between the respective web sections by reducing the width of the foot. This led, however, to the drawback that the sawtooth wires tended to tilt laterally. When assembling the sawtooth wires on the jacket of the main drum, they must define together with the jacket an angle of 90°. This leads to the fact that a reducing of the width of the foot is limited at least due to assembling reasons.

A further drawback of the known card clothing is that large air volumes are moved between and by the card clothing, which air volume can produce turbulences due to the high rotational speed (e.g. 300–600 rpm) of the main carding drum, which turbulences influence the effect of the carding detrimentally. Until now, attempts have been made to lead those masses of air away from the surface of the card clothing by means of slotted gratings and baffle plates outside of the carding area proper. Such measures have, however, only an extremely limited effect.

SUMMARY OF THE INVENTION

A general object of the present invention is to provide a sawtooth all-steel card clothing, which positively ensures the fibres to be continuously located within the carding area of the tips of the teeth, allowing a more efficient opening of the fibre masses, inclusive a more intensive cleaning of cotton fibres.

A further object of the present invention is to provide a sawtooth all-steel card clothing for a carding engine, in which the total height of the foot and web section amounts to less than 2.0 millimeters and more than 0.5 millimeters, and in which the ratio total height to height of foot amounts to less than 1.8.

Preferably, the height of the foot amounts to less than 1.2 millimeters and to more than 0.1 millimeters. It has been found that a specific advantage is arrived at if the width of the web amounts to less than 0.02 millimeters and the width of the foot amounts to less than 0.5 millimeters and more than 0.1 millimeters. In accordance with a further preferred embodiment the depth of the teeth is in the range between 0.05 millimeters and 0.7 millimeters.

BRIEF DESCRIPTION OF THE DRAWING

The present invention will be better understood and objects other than those set forth above will become apparent when consideration is given to the following detailed description thereof. Such description makes reference to the annexed drawing, wherein:

FIG. 1 illustrates a section through a sawtooth all-steel card clothing according to the prior art;

FIG. 2 illustrates a sideview of an embodiment of the sawtooth all-steel card clothing in accordance with the invention;

FIG. 3 illustrates a section along line III—III of FIG. 2; and in

FIG. 4 an illustration in accordance with DIN standards ISO 5234 is shown for illustration of the identifications of the angles.

DESCRIPTION OF THE PREFERRED EMBODIMENT

FIG. 1 illustrates a section through a sawtooth all-steel card clothing in accordance with the prior art, in which figure the three sawtooth wires closely abutting each other as shown comprise teeth 1, web sections 2 and foot sections 3. As can be seen, an empty space is present between every two respective web sections 2, in which space an accumulation of fibres occurs such as mentioned above, and such, that these fibres can no longer be seized or grasped, respectively, by the tips of the teeth of the card clothing of the flats of the carding engine. This fibre accumulating area is identified by the reference numeral 4.

FIG. 2 illustrates a sideview and FIG. 3 a cross-sectional view of a sawtooth wire, designed in accordance with the present invention. The total height a of the web section 2 and the foot section 3 amounts to less than 2.0 millimeters. The ratio of mentioned total height a to the height of the foot c of the foot section 3 amounts thereby to less than 1.8. The height of foot c amounts here to less than 1.2 millimeters, is however larger than 0.1 millimeters. The width e of the web (see FIG. 3) amounts to less than 0.02 millimeters and the width d of the foot thereof to less than 0.5 millimeters, but more than 0.1 millimeters. The depth b of the teeth is in the range between 0.05 millimeters and 0.7 millimeters.

The angle of elevation, i.e. the breast angle α amounts to ≧15°, in order to guarantee a positive guiding and adhering of the fibres, which is of great importance regarding the carding. FIG. 4, which is in accordance with DIN ISO 5234 illustrates the standard definitions of the angles. These are :

| Symbol | Term | Definition |
| --- | --- | --- |
| α | = angle of breast: | angle between surface of breast and vertical axis relative to the base of the wire |
| β | = angle of wedge: | angle between angle of breast and angle of neck of the tooth |
| γ | = angle of neck: | angle between neck or anticline, respectively, and the basis of the wire |
| δ | = angle of breast: | angle between breast surface and base of the wire |
| ε | = angle of opening: | corresponds to angle of wedge (ε = β). |

The card clothing is made preferably of a hardable steel. It is thereby specifically advantageous to use alloyed steels, specifically highly alloyed hardable and not hardable carbon steel.

This sawtooth all-steel card clothing includes practically no dead volumes or spaces, respectively, outside of the carding area, in which an accumulation 4 of fibres (see FIG. 1) could grow. This results in an optimal carding at the surface of the main carding cylinder as well as a complete transferring from this main carding cylinder to the doffer roller. Conclusively, the subsequent yarn qualities are higher than hitherto possible. Because now the tips of the teeth are extremely fine, such as set forth above, there is the advantage that the tips must no longer be resharpened such as has been the customary procedure until now. If the tips are eroded, i.e. have become dull, the complete card clothing is simply exchanged. Accordingly, the efficiency of a carding engine thus equipped is considerably increased, because the intermediate or regrinding of the all-steel card clothing is no longer necessary until a replacement of the entire clothing becomes necessary. Furthermore, the indicated dimensions reveal the now much smaller masses or volumes, respectively, of air that are moved along by the rotation of the main drum, such that a correspondingly smaller turbulence is generated und conclusively an imroved parallelism of the fibres can be attained.

It is to be clearly noted that the card clothing of the flats can remain the same as hitherto generally known and may be applied independently from the respective card clothing of the main drum designed in accordance with the present invention.

While there is shown and described a present preferred embodiment of the invention, it is to be distinctly understood that the invention is not limited thereto, but may be otherwise variously embodied and practiced within the scope of the following claims.

I claim:

1. A saw tooth all-steel card clothing for a carding engine, which card clothing includes a foot section followed by a web section including the teeth,
   in which the total height of the foot and web section amounts to less than 2.0 millimeters and more than 0.5 millimeters, and in which the ratio of the total height to the height of the foot amounts to less than 1.8.

2. The card clothing of claim 1, in which the height of the foot amounts to less than 1.2 millimeters and more than 0.1 millimeters.

3. The card clothing of claim 1, in which the width of the web amounts to less than 0.02 millimeters and the width of the foot amounts to less than 0.5 and more than 0.1 millimeters.

4. The card clothing of claim 1, in which the depth of the teeth is in the range between 0.5 millimeters and 0.7 millimeters.

5. The card clothing of claim 1, in which said card clothing consists of a highly alloyed carbon steel.

6. The card clothing of claim 1, in which the breast angle 60 measured against the vertical line is ≧15°.

* * * * *